F. M. ENGELHARDT.
COMPUTING SCALE.
APPLICATION FILED FEB. 19, 1906.

1,005,947.

Patented Oct. 17, 1911.

Witnesses
Edw. P. Barrett
Louis B. Erwin

Inventor
Frank M. Engelhardt
by Rector Hibben & Davis
His Atty's

UNITED STATES PATENT OFFICE.

FRANK M. ENGELHARDT, OF CHICAGO, ILLINOIS, ASSIGNOR TO TOLEDO COMPUTING SCALE COMPANY, OF TOLEDO, OHIO, AND NEWARK, NEW JERSEY, A CORPORATION OF NEW JERSEY.

COMPUTING-SCALE.

1,005,947.   Specification of Letters Patent.   Patented Oct. 17, 1911.

Application filed February 19, 1906. Serial No. 301,888.

*To all whom it may concern:*

Be it known that I, FRANK M. ENGELHARDT, a citizen of the United States, residing at Chicago, in the county of Cook and State of Illinois, have invented certain new and useful Improvements in Computing-Scales, of which the following is a specification.

The present invention relates to that class of computing scales in which the scale beam is coupled to a pendulum and the pendulum has compounded with it an index-hand extending over the face of a table or chart.

As is well known an index-hand in a scale of the above type carries one or more series of numbers denoting prices per pound of commodities to be weighed upon the scales, and the table or chart carries concentric rows of numbers denoting numerical products or multiplication by such prices per pound of different weights, the chart or table carrying in addition to said rows of product numerals one or more rows of weight numerals. Such computing scales as this are shown in the De Vilbiss Re-issue Patent No. 12,029, dated September 9, 1902, and their general mode of operation is well understood as scales of this character are in general use at the present time. It will not be necessary therefore to dwell upon the general mode of operation of such scales. Suffice it to say that the index-hand sweeping over the face of the table or chart will come to rest at a position determined by the weight of the commodity in the scale pan and the proper amount to be charged for such commodity will be ascertained by reading from the chart or table adjacent to the price per pound appearing on the index-hand.

The principal objects of the present invention are to render more prominent the numerical product on the chart or table and to prevent obscuring such product by a shadow cast by the index-hand. Of course in order to reach the requirements of a store-keeper or merchant using scales of this kind the table or chart must carry a large number of inscriptions and as it is also desirable to confine the scales to reasonable dimensions the inscriptions on the chart or table cannot be made very large. Consequently persons with poor eye-sight have difficulty in reading the inscriptions. Furthermore when the inscriptions are to be read along one edge of the index-hand the light may strike the scales in such a way as to cause the index-hand to cast a shadow over the table where the inscription is to be read. The present invention aims to obviate these difficulties.

With the above stated and incidental objects in view the invention consists in certain novel features of construction and combinations of parts, the essential elements whereof are recited in the appended claims and a preferred form of embodiment of which is specifically described hereinafter and illustrated in the accompanying drawings.

Of said drawings Figure 1 represents a front elevation of computing scales of the type above indicated with the present invention applied thereto; Fig. 2 represents a front elevation on a large scale of the upper portion of the index-hand and Fig. 3 represents a cross-section of said index-hand.

In view of the fact that, as already stated the computing scales to which the present invention relates are not only well known but fully disclosed and described in the above mentioned De Vilbiss patent, it will be unnecessary to go into a detailed description thereof, consequently only a brief enumeration of a few of the elements thereof will be given.

The reference numeral 1 designates the base of the scales, 2, a housing arising therefrom to the left, 3, a table or chart within said housing, 5, the pivot or fulcrum of the pendulum, 6, the pendulum, 8, the scale beam, 9, the platform and 10, the scale pan. In previous constructions and as shown in said De Vilbiss patent the index-hand which rises from said pivot or fulcrum 5 is constructed to indicate along its left-hand edge and to assist in locating the particular inscription on the table or chart, the index-hand carries a series of fingers designed to pass along the graduations of the several rows of inscriptions on said table or chart.

As also shown in said patent the index-hand carries two rows of price per pound numerals which as explained in said patent are inscribed on said hand in contrasting colors. Furthermore the chart or table carries two rows of weight numerals in concentric arcs of circles at the upper part of the chart or table and these two rows are correspondingly inscribed in contrasting colors. The double row or series of price per pound numerals and weight numerals are for the purpose of increasing the capacity of the scales in a well known manner which needs no detailed explanation here. It is mentioned because the present invention is shown adapted to scales having this capability for different capacities. The index-hand as here shown comprises a supporting end 4 embracing the fulcrum or pivot 5 and to which are fastened two bars 11 and 12 preferably composed of light metal such as aluminum bent so as to provide channels on the inner side as shown in Fig. 3. A magnifying glass 13 engages these channels and extends practically the length of the index-hand and on the inner or under-side of said glass there is a hair-line 14 which extends throughout the longitudinal center of the glass. Each of the bars 11 and 12 is marked off on its outer surface into subdivisions and between the subdivisions appear the price per pound inscriptions. The side bars or strips may also have fingers 18 projecting from their inner edges over the glass 13 to facilitate location of the product numerals on the table or chart. The upper end of the index-hand is composed of a frame-piece 15 of generally rectangular outline with centrally located pointers 16 extending toward each other over the two rows of weight numerals. This frame-piece will preferably have its surface colored contrastingly to correspond with the contrasting colors of the two rows of weight numerals and the two rows of price per pound numerals. Thus the lower part of the frame-piece out of which the lower pointer 16 is formed will be colored the same as the left-hand row of price per pound numerals and the lower row of weight numerals, whereas the upper half of the frame-piece will be colored to correspond with the right-hand row of price per pound numerals and the upper row of weight numerals. It will be obvious that the pointers 16 serve the purpose of indicating the weight of a commodity in the scale pan.

In a construction embodying the present invention the reading of the table or chart is not done as heretofore to the left of the index-hand but the hair-line upon the magnifying glass passes through the gradations of the concentric rows of product numerals on the table or chart and serves as a guide to determine in what particular vertical or radial line of such gradations the desired product will be found. Hence, to locate such product the operator casts his eye along the index-hand at the left or right according to whether the scales are adjusted for one capacity or the other, and having located the price per pound of the commodity being weighed will find the product marked by the hair-line of the magnifying glass opposite the particular subdivision of the index-hand in which the price per pound appears.

It will be seen that the construction above described is well calculated to fulfil the objects primarily stated. The magnifying glass is of such character as to magnify the numeral laterally and not distort the curved lines which separate the series of product numerals. This magnifying of the particular inscription which is to be read upon the chart or table effectually accomplishes one of the objects heretofore stated. The other object heretofore stated is accomplished by the spacing of the reading line from the edges of the index-hand which will be seen to effectually prevent any obscuring of the inscriptions on the table or chart by shadows cast upon the latter by portions of the index-hand. The latter feature of the invention can of course be employed without necessarily using a magnifying glass. It is obvious the reading line might be carried between the two side bars or strips of the index-hand otherwise than upon such glass. In such case the side bars or strips need not necessarily be channeled. For that matter the channeling is not essential even when the glass is used for the latter might be held in place through other instrumentalities.

Of course it is not essential in all cases that there be two side bars or strips, for the scales might not have the provisions for different capacities. Having but a single capacity there would not be two rows of price per pound numerals in the index-hand. Consequently there would be no necessity for two graduated side bars or strips.

Other modifications of the construction here shown can be made without departing from the spirit and scope of the present invention.

What is claimed is:

1. In computing scales of the character described, the combination with a chart of computations, of an index-hand overlying the same and having confronting bars or strips spaced apart and bearing different longitudinal series of graduated price numerals correspondingly disposed and an intervening body supplying a reading line extending between the said bars spaced from the confronting edges thereof to intersect computations on the chart so that the latter may be read from either of the confronting edges of the said index-hand bars or strips while the index-hand stands in a single position.

2. In computing scales of the character described, the combination with a chart of computations, of an index hand overlying the same and bearing different longitudinally extending series of graduated price numerals spaced apart and correspondingly disposed, said index hand having a transparency longitudinally co-extensive with said series of price numerals and a reading line associated with said transparency and laterally spaced from both series of price numerals to intersect computations on the chart so that the latter may be read from either of the series of price numerals while the index hand stands in one position.

3. In computing scales of the character described, the combination with a chart of computations, of an index-hand overlying the same and bearing different longitudinally extending series of graduated price numerals spaced apart and correspondingly disposed, said index-hand having magnifying glass longitudinally co-extensive with said series of price numerals and a reading line associated with said magnifying glass and laterally spaced from both series of price numerals to intersect computations on the chart so that the latter may be read from either of the series of price numerals while the index-hand stands in one position.

4. In computing scales of the character described, the combination with a chart of computations, of an index hand overlying the same and having confronting bars or strips spaced apart and bearing different longitudinal series of graduated price numerals thereon correspondingly disposed, and a magnifying glass between said bars with a reading line spaced from the confronting edges thereof to intersect computations on the chart so that the latter may be read from either of the confronting edges of the said bars or strips while the index hand stands in a single position.

5. In computing scales of the character described, the combination with a chart having concentric rows of computations and a row of weight graduations concentric therewith; of an index hand extending radially of said chart and having longitudinal series of graduated price numerals and a reading line spaced laterally therefrom and in a fixed relation thereto and weight pointers extending toward each other in alinement with and in fixed relation to said reading line.

6. In computing scales of the character described, the combination with a chart of weights and computations, of an index hand overlying the same and having weight pointers extending toward each other and bearing a longitudinally extending series of graduated price numerals, said index hand having a transparency longitudinally co-extensive with said series of price graduations and a reading line associated with said transparency and extending parallel with the series of price numerals and in alinement with the weight pointers to intersect computations on the chart.

7. In computing scales of the character described, the combination with a chart of weights and computations, of an index hand overlying the same and having weight pointers extending toward each other and bearing a longitudinally extending series of graduated price numerals, said index hand having magnifying glass longitudinally co-extensive with said series of price numerals and a reading line associated with said magnifying glass and extending parallel with the series of price numerals and in alinement with the weight pointers to intersect computations on the chart.

8. In computing scales of the character described, the combination with a chart of weights and computations, of an index hand overlying the same and having weight pointers extending toward each other and bearing longitudinally extending series of graduated price numerals spaced apart and correspondingly disposed, said index hand having a transparency longitudinally co-extensive with said series of price numerals and a reading line associated with said transparency and laterally spaced from both series of price numerals and in alinement with the weight pointers to intersect computations on the chart; substantially as and for the purpose described.

9. In computing scales of the character described, the combination with a chart of weights and computations, of an index hand overlying the same and having weight pointers extending toward each other and bearing longitudinally extending series of price numerals spaced apart and correspondingly disposed, said index hand having magnifying glass longitudinally co-extensive with said series of price graduations and a reading line associated with said magnifying glass and laterally spaced from both series of price numerals and in alinement with the weight pointers to intersect computations on the chart; substantially as and for the purpose described.

10. In computing scales of the character described, an index hand having weight pointers extending toward each other and spaced side bars bearing graduated price unit numerals; and an intervening body supplying a reading line midway between said side bars in alinement with the weight pointers.

11. In computing scales of the character described, an index hand having weight pointers extending toward each other and spaced side bars bearing graduated price unit numerals; and a glass between said bars supplying a reading line in alinement with the weight pointers.

12. In computing scales of the character described, an index hand having weight pointers extending toward each other and spaced side bars bearing graduated price unit numerals; and a magnifying glass between said bars supplying a reading line in alinement with the weight pointers.

FRANK M. ENGELHARDT.

Witnesses:
 FRANK PARKER DAVIS,
 LOUIS B. ERWIN.